United States Patent Office 2,899,356
Patented Aug. 11, 1959

2,899,356

CYANACETHYDRAZIDE COMPOSITIONS FOR TREATING LUNGWORMS AND METHODS FOR USING SAME

Norman Greenhalgh and John Kenneth Walley, Manchester, England, assignors to Imperial Chemical Industries Limited, Millbank, London, England, a corporation of Great Britain No Drawing. Application April 29, 1957
Serial No. 655,462

Claims priority, application Great Britain
September 21, 1956

12 Claims. (Cl. 167—53.1)

This invention relates to a treatment process and more particularly it relates to a process for the treatment of animals with worm infestations for example cattle, sheep, goats, pigs and poultry with lungworm infestation.

According to the invention we provide a process for the treatment of animals with worm infestations which comprises applying to the said animals an effective amount of cyanacethydrazide.

The infected animals for example cattle, sheep, goats, pigs or poultry may be treated with the said cyanacethydrazide in any suitable manner known to the art. Thus for example they may be treated by subcutaneous or intramuscular routes by injection of aqueous or oily solutions or suspensions of cyanacethydrazide or by inhalation or by intratracheal injection or by the oral route by direct administration using a stomach tube or in water as a drench or in drinking water or in food for example in milk in wet mash or in other conventional foodstuffs.

The cyanacethydrazide may be applied to the infected animals by injection in the form of a sterile aqueous solution or suspension thereof. The said sterile aqueous solutions or suspensions may contain the cyanacethydrazide in any proportion which is suitable for administration. Thus the sterile aqueous solutions or suspensions may contain between 0.5% and 30% by weight of cyanacethydrazide and preferably they contain between 2.5% and 25% by weight of cyanacethydrazide.

According to a further feature of the invention we provide new compositions of matter which are sterile aqueous solutions or suspensions comprising not less than 0.5% by weight and preferably between 2.5% and 25% by weight of cyanacethydrazide.

The said aqueous solutions or suspensions may be stabilised by the incorporation therein of one or more antioxidants and/or buffering agents or by storage in the absence of air or oxygen for example in an atmosphere of nitrogen or carbon dioxide.

Antioxidants which are suitable as stabilising agents include for example water-soluble hydrosulphites for example sodium hydrosulphite, water-soluble metabisulphites for example sodium metabisulphite and sulphur dioxide.

Buffering agents which are suitable as stabilising agents include for example organic buffering agents for example glycine.

The stabilised aqueous solutions or suspensions contain preferably between 0.1% and 5% by weight of the stabilising agent for example anti-oxidants and/or buffering agents for example sodium metabisulphite.

The sterile injectable aqueous solutions or suspensions may also optionally contain other injectable ingredients, which are of known veterinary utility when so administered, dissolved or suspended therein. Such ingredients include for example antibacterial agents for example sulphadimidine, stable penicillin preparations and other anthelmintic agents for example 1-diethylcarbamyl-4-methylpiperazine.

The preferred amounts of such ingredients present in such compositions normally fall within the range at which the known veterinary utilities of the ingredients are operative. The relative amounts of the various components, including cyanacethydrazide, present in the compositions are therefore in general broadly proportional to the respective median effective doses of the individual components.

Those compositions which are suspensions contain their particulate matter in a finely divided form, preferably of a particle size substantially below 100 microns. Such compositions may optionally contain small amounts of such agents as are commonly used to facilitate the manufacture and maintain the efficacy and stability of aqueous suspensions. They may for example contain dispersing agents for example condensation products of phenol and alkylphenols for example octylcresol with ethylene oxide for example the condensation product of octylcresol with 8–10 molecular proportions of ethylene oxide, condensation products of formaldehyde and naphthalene sulphonic acids for example disodium methylene-bis-naphthalene-2-sulphonate and fatty acid esters of polyglycerol for example polyglyceryl ricinoleate.

Sterilisation of the injectable aqueous solutions or suspensions may be brought about by known procedures, for example by aseptic formulation, by Seitz filtration, by irradiation or by incorporation in the compositions of sterilising agents or again in suitable cases by heat treatment.

The said sterile stabilised injectable aqueous solutions or suspensions may be obtained by addition of a sterile cyanacethydrazide powder optionally incorporating a stabilising agent and optionally incorporating other injectable ingredients which are of known veterinary utility when so administered and/or a dispersing agent to sterile water.

The cyanacethydrazide may also be applied to infected animals by injection in the form of a sterile solution or suspension in an injectable vegetable oil. The said sterile solution or suspension may contain the cyanacethydrazide in any proportion suitable for administration. Thus the solution or suspension may contain at least 0.5% by weight of cyanacethydrazide.

According to a further feature of the invention we provide new compositions of matter which are sterile injectable solutions or suspensions comprising not less than 0.5% by weight of cyanacethydrazide in a suitable injectable vegetable oil.

Injectable vegetable oils which are suitable for use in such compositions include for example arachis oil, olive oil and coconut oil. Said injectable vegetable oils may optionally contain a gelling agent, for example aluminium stearate. These sterile oily injectable solutions or suspensions preferably contain between 1% and 30% by weight of cyanacethydrazide and more particularly between 2.5% and 25% by weight of cyanacethydrazide.

The sterile oily injectable solutions or suspensions may be stabilised by the incorporation therein of one or more antioxidants or by storage in the absence of air or oxygen for example in an atmosphere of nitrogen.

The antioxidants which are suitable as stabilising agents include for example propyl gallate and 2:6-di-tert-butyl-4-methylphenol.

The stabilised solutions or suspensions contain preferably between 0.02% and 0.1% by weight of the stabilising agent or antioxidant.

The sterile oily injectable solutions or suspensions may also optionally contain other injectable ingredients which are of known veterinary utility when so administered dissolved or suspended therein. Such ingredients include for example antibacterial agents for example sulphadimidine and stable penicillin preparations.

The preferred amounts of such ingredients present in the oily compositions are within the range at which the known veterinary utility of these ingredients is operative. The relative amounts of the various components, including cyanacethydrazide, present in the compositions are therefore in general broadly proportional to the respective median effective doses of the individual components.

The oily compositions which are suspensions contain their particulate matter in a finely divided form, preferably of a particle size substantially below 100 microns.

Sterilisation of the injectible solutions or suspensions of the invention may be brought about by known procedures for example by aseptic formulation, by irradiation or by incorporation of sterilising agents or again in suitable cases by heat treatment.

The cyanacethydrazide may also be applied to infected animals by oral administration. Compositions suitable for oral administration may contain cyanacethydrazide in any proportion.

Thus according to a further feature of the invention, we provide new compositions of matter, suitable for oral administration to animals, comprising not less than about 0.1% by weight of cyanacethydrazide, at least one additional component selected from the group of compounds comprising stabilising agents for cyanacethydrazide and compounds which are of known veterinary utility when administered orally, and optionally a non-toxic diluent or diluent mixture.

Compounds which are suitable stabilising agents for cyanacethydrazide include antioxidants for example hydrosulphites, for example sodium hydrosulphite, and metabisulphites, particularly sodium metabisulphite, and buffering agents, for example organic buffering agents for example glycine. The preferred amounts of stabilising agents required comprise from 0.005 to 1.0 part of antioxidant or from 0.005 part to 1.0 part of buffering agent per part of cyanacethydrazide.

Compounds of known veterinary utility when administered orally include antibacterial agents for example sulphadimidine and stable penicillin preparations, anthelmintic agents for example phenothiazine, hexachloroethane, piperazine and its salts for example tripiperazine dicitrate, pentahydrate and 1-diethylcarbamyl-4-methylpiperazine, vitamin supplements for example vitamin B mixtures, mineral salt mixes for example mixes containing sodium and cobalt salts, feed suplements for example antibiotics, oral larvicides and hormones for example stilboestrol. The relative amounts of the veterinarily useful components, including cyanacethydrazide, which may be present in the compositions of the invention are in general broadly proportional to their respective effective doses.

The non-toxic diluents which may be used in the compositions of the invention include for example liquid diluents, for example water or milk, solid diluents which may be soluble or insoluble in water for example chalk, kaolin, talc, urea and other known pharmaceutical excipients and also animal feeding stuffs. It is further to be understood that the non-toxic diluents may incorporate small amounts of non-toxic adjuvants such as are commonly used in formulating practice. Such adjuvants include for example dispersing agents for example a phenol-ethylene oxide condensation product for example a condensation product of octylcresol with about 8-10 molecular proportions of ethylene oxide, condensation products of formaldehyde and naphthalene sulphonic acids for example disodium methylene-bis-naphthalene-2-sulphonate and fatty acid esters of polyglycerol for example polyglyceryl ricinoleate. Further adjuvants may be anti-caking agents for example calcium phosphate which allow the preparation of free-flowing solid compositions in the presence of possible hygroscopic agents for example urea used as the non-toxic diluent.

The said compositions for oral administration can exist in a variety of physical forms for example as aqueous solutions or suspensions, as powders and premixes suitable for admixture with animal feeding stuffs, as tablets and capsules and in animal feeding stuffs for example animal feeding stuffs shaped as nuts or pellets.

As a particularly useful composition suitable for oral administration there may be mentioned for example a composition containing 10% by weight of cyanacethydrazide, 0.1% by weight of sodium metabisulphite, 0.5% by weight of calcium phosphate and 89.4% by weight of urea. This composition is suitable for admixture to animal foodstuffs, to give a concentration equivalent to 0.05% by weight of cyanacethydrazide in the total food.

A further particularly valuable composition suitable for oral administration may be for example a composition containing 6 parts by weight of tripiperazine dicitrate pentahydrate to 1 part by weight of cyanacethydrazide which may optionally be diluted with a non-toxic diluent for example urea and may also optionally contain a stabilising agent for example sodium metabisulphite and an anti-caking agent for example calcium phosphate. The said composition is valuable for use in the simultaneous treatment of lung-worm infestations and ascariasis in pigs.

A further particularly valuable composition suitable for oral administration consists of a dispersible powder which can be mixed with water to form an aqueous suspension which may then be administered as a drench to cattle infected with lungworm and associated pneumonia. Such a valuable aqueous dispersible powder comprises 13% by weight of cyanacethydrazide, 0.13% by weight of sodium metabisulphite, 0.125% by weight of disodium methylene-bis-naphthalene-2-sulphonate, 0.1% by weight of polyglyceryl ricinoleate and 86.65% by weight of sulphadimidine.

Additional compositions of matter suitable for oral administration are mixtures of cyanacethydrazide and a pulverulent non-toxic diluent for example urea.

Thus according to a further feature of the invention we provide new compositions of matter suitable for oral administration to animals comprising not less than 0.1% by weight of cyanacethydrazide and a pulverulent non-toxic diluent.

Pulverulent non-toxic diluents which are suitable for use in the said compositions include for example pulverulent non-toxic diluents which may be soluble or insoluble in aqueous media for example in water or milk and which may be inorganic or organic material for example talc, kaolin, chalk and urea.

The said compositions may be obtained by any means known to the art for example by mixing together and/or grinding together the ingredients of the said compositions in such proportions as to provide the desired compositions. As suitable compositions there may be mentioned for example those compositions containing 10% by weight of cyanacethydrazide and 90% by weight of chalk, talc, kaolin or urea.

The said compositions may be added either in the dry state or dissolved or suspended in an aqueous medium for example water to a suitable animal foodstuff or foodstuff mixture. The said animal foodstuff or foodstuff mixture includes such animal foodstuffs or foodstuff mixtures as would normally per se form either a complete meal or a separately assimilable part-meal for the animal under treatment. Alternatively the said compositions may be dissolved or suspended in an aqueous media for example water or milk and administered to animals in the form of a drench or as drinking media.

Thus suitable foodstuff compositions of matter which are to be used for the treatment of worm infestations for example lungworm infestations in animals may be mixtures of suitable material which can be used as an animal foodstuff together with cyanacethydrazide and a pulverulent non-toxic diluent.

The pulverulent non-toxic diluent in the said foodstuff compositions of matter may be those diluents as stated above and may be for example talc, kaolin, chalk or urea. The cyanacethydrazide is preferably present in the foodstuff compositions of matter in a concentration of at least 0.01% by weight of the said compositions. The suitable materials which may be used as animal foodstuffs may be for example those materials known to the art for example feeding meals and concentrates for example crushed oats, barley meal, fish meal, linseed meal and ground nut meal, mixed meals and silage.

It is to be understood that the pulverulent non-toxic diluents used in the invention may incorporate small amounts of non-toxic adjuvants such as are known and commonly used in the practice of formulating veterinary compositions. Such adjuvants include for example wetting or dispersing agents for example a phenol-ethylene oxide condensation product for example a condensation product of octylcresol with about 8-10 molecular proportions of ethylene oxide, condensation products of formaldehyde and naphthalene sulphonic acids for example disodium methylene-bis-naphthalene-2-sulphonate and fatty acid esters of polyglycerol for example polyglyceryl ricinoleate.

The foodstuff compositions of matter may be in a variety of physical forms for example as a powder or in a shaped form such as tablets, nuts or pellets.

The compositions may be applied directly or indirectly in the treatment of lungworm infestation of animals for example cattle, sheep, pigs, goats and poultry by oral administration.

As stated above, cyanacethydrazide is valuable in the treatment of worm infestations for example worms infesting the lungs and livers of animals for example cattle, sheep, goats, pigs and poultry. It is an effective agent against the very important Metastrongylidae family of worms. Thus it is effective in removing from the air passages of the lungs *Dictyocaulus filaria* in sheep and goats, *Dictyocaulus viviparus* in cattle, *Protostrongylus rufescens* and *Muelleris capillaris* in sheep and goats and *Metastrongylus apri* in pigs. It is also effective in removing *Syngamus trachea* from the trachea of chickens and *Fasciola hepatica* from the livers of sheep. As a means of carrying out the said treatment process under optimum dosage conditions animals for example lambs, kids, calves and pigs of up to 45 kilogrammes of live weight may be given 17.5 mg./kg. of cyanacethydrazide by means of oral administration or 15 mg./kg. by means of subcutaneous administration, for cattle of live weight greater than 350 kilogrammes a dosage of 5 grammes may be used and for sheep, pigs and goats of live weight greater than 70 kilogrammes a dosage of 1 gramme may be used.

The invention is illustrated but not limited by the following examples in which the parts are by weight:

Example 1

A 25% w./v. sterile solution of cyanacethydrazide in water is injected subcutaneously at the rate of 25 mgm./kgm. to a calf of live-weight 65 kgm., on each of three successive days. It is observed that all except 32 of the *Dictyocaulus viviparus* are removed from the air passages of the lungs with marked clinical improvement of the animal. A control calf of similar weight and infection which remains untreated is found to have 1567 adult worms in the lungs.

Example 2

A 20% w.v. sterile solution in water of cyanacethydrazide is injected subcutaneously at the rate of 15 mgm./kgm. of live-weight to a calf on each of three successive days. It is observed that all except 13 of the *Dictyocaulus viviparus* are removed from the lungs with marked clinical improvement of the animal. A control calf of similar weight and infection which remains untreated is found to have 1956 adult worms in the lungs.

Example 3

5 grammes of cyanacethydrazide are injected subcutaneously as a 25% w./v. sterile solution in water on each of three successive days to three heifers (of liveweight 410, 420, 425 kgm. respectively). It is observed that all of the *Dictyocaulus viviparus* present in the air passages of the lungs of these animals are removed and there is a resultant improvement in the clinical condition of these animals.

Example 4

A group of nine cattle ranging in age from one to two and a half years and showing clinical symptoms of "husk" are grazed on pastures infected by *Dictyocaulus viviparus*. The animals are given subcutaneous injections of a 25% w./v. sterile solution of cyanacethydrazide in water at a rate of 15 mgm./kgm. with a maximum dose of 5 gm. to any one animal (live-weight range is 280 kgm. to 410 kgm.). Dosing is commenced (day 1) when the disease is confirmed by the finding of larvae in the faeces. Dosing is repeated on days 2, 10, 11 and 21. No larvae are found in the faeces after day 12 and there is a continuous improvement in the clinical condition of the animals. It is also observed that there is no interference with pregnancies in these treated cattle of two, five, six and eight months' duration.

Example 5

A 1% w./v. solution in water of cyanacethydrazide is administered as an oral drench to each of three calves at the rate of 15 mgm./kgm. of live-weight on each of three successive days. It is observed that at least 1675 *Dictyocaulus viviparus* are removed from the lungs of these three calves of average live-weight 105 kgm. There is marked improvement in clinical condition of the animals and only 22 live worms are left in the three animals.

Example 6

A milk substitute liquid feed containing cyanacethydrazide is fed to two calves such that cyanacethydrazide is administered at the rate of 25 mgm./kgm. to one calf of live-weight 65 kgm. and at the rate of 15 mgm./kgm. to a second calf of live-weight 71 kgm. This treatment is repeated once daily for three successive days and it is observed that all the *Dictyocaulus viviparus* present are expelled except for 12 live worms in the first case and 69 live worms in the second case. There is a marked clinical improvement in the animals. A control calf which remains untreated is found to have 1567 *Dictyocaulus viviparus* in its air passages.

Example 7

A calf of live-weight 150 kgm. and showing severe "husk" symptoms is given 3 gm. of cyanacethydrazide (i.e. 20 mgm./kgm. of body weight) in 2 litres of drinking water. The treatment is repeated on three successive mornings, water having been withheld overnight (approx. 14 hrs.). All the lungworms, *Dictyocaulus viviparus*, are expelled except 13, and there is a marked clinical improvement in this animal. A control animal which is untreated is found to have 986 worms in its lungs.

Example 8

A premix containing 10% w./w. of cyanacethydrazide and 90% w./w. of urea is mixed with a concentrated corn mixture on each of three successive days. This foodstuff is then fed to two bullocks such that each receives cyanacethydrazide at the rate of 20 mgm./kgm. of live-weight daily (average live-weight 208 kgm.). It is observed that all the lungworms, *Dictyocaulus viviparus*, are removed from the lungs and there is a marked clinical improvement in these animals.

Example 9

Oral dosing of two heifers, live-weights 173 kgm. and 162 kgm. with 15 gm. each of phenothiazine and 15 mgm./kgm. of live-weight each of cyanacethydrazide in 150 ml. of water is carried out on each of three sucessive days. It is observed that the intestinal worm egg count is reduced from an average of 600 eggs per gramme to less than 50 eggs per gramme and the *Dictyocaulus viviparus* larvae are reduced from 200 larvae per gamme to 0 in seven days. Also from 12 to 84 hours after dosing of the animals all the Dictyocaulus larvae voided in the faeces are dead. There is a marked clinical improvement in the animals after dosing. After ten days, the intestinal worm egg count in the faeces is 300 eggs per gramme and a few Dictyocaulus larvae—less than 5 larvae per gramme are present. A further single dose of 40 gm. of phenothiazine and the equivalent of 17.5 mgm./kgm. of live-weight of cyanacethydrazide is administered orally as a drench to each animal. In three days the intestinal worm egg count is reduced to less than 20 eggs per gramme and the Dictyocaulus larvae are absent from the faeces. No recurrence of eggs or larva takes place during the next 28 days.

Example 10

Oral dosing of a Jersey bull-calf, of live-weight 157 kgm. and having a parasitic pneumonia due to *Dictyocaulus viviparus* and an acute coccidiosis due to *Eimeria zurnii*, with a mixture consisting of cyanacethydrazide at the rate of 20 mgm./kgm. live-weight and sulphadimidine at the rate of 120 mgm./kgm. live-weight in 200 ml. of water is carried out daily for three successive days. It is then observed that the Dictyocaulus larvae are cleared from the faeces within six days and blood in the faeces is not detectable after four days while the condition of diarrhoea clears up. There is also a marked improvement in the general condition of the animal.

Example 11

Two Friesian calves, of live-weight 112 and 123 kgm. respectively each showing signs of enteritis with intense scouring and with *Dictyocaulus viviparus* larvae of 10 to 20 per gramme of faeces, are dosed orally with a mixture of cyanacethydrazide at the rate of 15 mgm./kgm. of live-weight and sulphadimidine at the rate of 120 mgm./kgm. of live-weight in 150 ml. of water for three successive days. It is observed that the scouring is stopped and the faeces are cleared of Dictyocaulus larvae. There is also a general improvement in the clinical condition of the animals.

Example 12

A sterile stabilised solution containing 25% w./v. of cyanacethydrazide and 0.25% w./v. of sodium metabisulphite in water is injected subcutaneously at the rate of 20 mgm./kgm. of live-weight on two successive days to one Ayrshire calf. It is observed that at least 96% (703) of the worms, *Dictyocaulus viviparus*, present in the lungs are expelled and there is an improvement in the clinical condition of the animal.

Example 13

5 grammes of cyanacethydrazide prepared as a 25% w./v. sterile solution in water is administered by subcutaneous injection to each animal of a herd of eleven heifers of live-weight range of 320 to 370 kgm. all animals showing clinical symptoms of lungworm, *Dictyocaulus viviparus*, infection (seven with more than 20 larvae per gm. of faeces). It is observed that there is a marked clinical improvement in the animals and no larvae are found in the faeces from the sixth day after dosing.

Example 14

Cyanacethydrazide is injected subcutaneously as a 15% w./v. sterile solution in water at the rate of 25 mgm./kgm. to a sheep (live-weight 28 kgm.) on each of three successive days. It is observed that this treatment removes all the fifth stage and immature *Dictyocaulus filaria* lungworms from the air passages of the sheep resulting in improvement in the clinical condition of the animal.

Example 15

Cyanacethydrazide is injected subcutaneously as a 25% w./v. sterile solution in water to a lamb at the rate of 25 mgm./kgm. (live-weight 24 kgm.) on each of three successive days. It is observed that this treatment removes at least 99 *Dictyocaulus filaria* and 5 *Protostrongylus rufescens* after the first dose, a further 23 *Dictyocaulus filaria* after the second dose and a further 5 *Dictyocaulus filaria* after the third dose. There are then only 5 live worms remaining in the lungs and there is a marked improvement in the clinical condition of the animal.

Example 16

Cyanacethydrazide is injected subcutaneously as a 25% w./v. sterile solution in water at the rate of 15 mgm./kgm. on each of three successive days to each of a group of five lambs (live-weight 25–36 kgm.). It is observed that all the lungworms, *Dictyocaulus filaria*, in three of the lambs are removed while only 3 and 4 worms remain in the fourth and fifth lambs. In all cases there is improvement in the clinical condition of the animals. In an untreated control group the number of *Dictyocaulus filaria* varied from 36 to 140 worms.

Example 17

Cyanacethydrazide is injected subcutaneously as a 15% w./v. solution in arachis oil at the rate of 15 mgm./kgm. on each of three successive days to each of a group of three lambs (live-weight range 20–25 kgm.). It is observed that this treatment removes 567 lungworms, *Dictyocaulus filaria*, which is not less than 98% of the worms originally present in the lungs. There is also a marked improvement in the clinical condition of the animals.

Example 18

Cyanacethydrazide is administered as an oral drench in the form of a 1% w./v. solution in water at the rate of 20 mgm./kgm. to a lamb (live-weight 20 kgm.) on each of three successive days. It is observed that this treatment removes at least 78 worms in the first 24 hour period, 263 worms in the second 24 hour period and 116 worms in the third 24 hour period. Only 2 live *Dictyocaulus filaria* are left in the lungs and the majority of the worms expelled are *Dictyocaulus filaria* while the remainder are *Muelleris capillaris*.

Example 19

A premix containing 10% w./w. of cyanacethydrazide and 90% w./w. of kaolin is mixed into a concentrate corn mixture and the foodstuff so obtained is then fed to three lambs such that each lamb receives cyanacethydrazide at the rate of 15 mgm. per kgm. (average live-weight 25 kgm.). It is observed that this treatment removes all except one lungworm, *Dictyocaulus filaria*, present in the air passage. The control lambs averaged 758 *Dictyocaulus filaria* in the lungs.

Example 20

5 grammes of phenothiazine and 15 mgm./kgm. of live-weight of cyanacethydrazide are administered orally on each of three successive days to a lamb of live-weight of 24 kgm. It is observed that this treatment reduces the intestinal nematode egg count from 1200 eggs per gramme to 200 eggs per gramme and the *Dictyocaulus filaria* larvae count from 1000 larvae per gramme to zero in six days. Moreover it is also observed that twelve hours after dosing all the first stage *Dictyocaulus filaria* larvae are dead and this killing action continues from the period when the larvae appear in the faces and thus the spread of infection is reduced. There is marked improvement in the clinical condition of the lamb.

*Example 21*

A mixture of 5 grammes of phenothiazine, 3 grammes of hexachloroethane and 15 mgm./kgm. of cyanacethydrazide is administered orally on each of three successive days to each of a group of 5 sheep of average live-weight of 22 kgm. It is observed that this treatment reduces the average intestinal nematode egg count from 10,500 eggs per gramme to 100 eggs per gramme and the *Dictyocaulus filaria* larvae count from an average of 300 larvae per gramme to zero in five days. The phenothiazine in the gut contents kills many of the first stage Dictyocaulus larvae during their passage along the gut. Subsequent slaughter of the animals reveals no Dictyocaulus remaining in the air passages.

*Example 22*

A group of four lambs, average live-weight 20 kgm., affected by parasite pneumonia due to the lungworm *Dictyocaulus filaria* and chronic coccidiosis due to *Eimeria arloingi, Eimeria faurei* and *Eimeria intricata* is treated orally with a mixture of cyanacethydrazide at the rate of 15 mgm./kgm. of live-weight and sulphadimidine at the rate of 150 mgm./kgm. of live-weight in 100 mls. of water daily for three successive days. It is observed that this treatment clears the Dictyocaulus larvae from the faeces and gives a marked clinical improvement and a reduction in respiratory rate of the animal. There is also a noticeable return to the normal pellets of the faeces.

*Example 23*

Cyanacethydrazide is injected subcutaneously as a 25% w./v. sterile solution in water at the rate of 15 mgm./kgm. and simultaneously sulphadimidine is injected subcutaneously as a 33.3% sterile solution in water at the rate of 150 mgm./kgm. on three successive days to two lambs having pneumonia due to the lungworm *Dictyocaulus filaria* and concurrent streptococcal and pasteurella infection of the lungs. It is observed that this treatment removes 97% of the lungworms from the lungs and the bacterial pneumonia is resolved with consequent marked improvement in the clinical condition of the animals.

*Example 24*

A sterile stabilised solution of cyanacethydrazide prepared as a 25% w./v. solution of cyanacethydrazide in water with 0.25% w./v. of sodium metabilsulphite as a stabilising agent is injected subcutaneously into two lambs (live-weight 18 kgm. and 19 kgm.) at the rate of 15 mgm. of cyanacethydrazide per kgm. live-weight on three successive days. It is observed that this treatment removes at least 97% of the *Dictyocaulus filaria* and *Protostrongylus rufescens* present in the animals together with some *Muelleris capillaris*. There is improvement also in the clinical condition of the animals.

*Example 25*

A group of ten unweaned lambs infected by the lungworm *Dictyocaulus filaria* and grazing on infected pasture are divided into two groups. The first group of five acts as a control and the second group is treated with cyanacethydrazide. The lambs in the treated group each receive an oral dose of cyanacethydrazide, as a 2% w./v. solution in water, at the rate of 17.5 mgm./kgm. live-weight on days 23, 24, 32, 33, 41 and 42 after first infection. Post-mortem on day 44 discloses a total of 578 lungworms, *Dictyocaulus filaria*, in the control animals and only 3 lungworms in the treated animals. It is also noted that there is an improved clinical condition and growth in the treated animals.

*Example 26*

Cyanacethydrazide is injected subcutaneously as a 20% w./v. sterile solution in water at the rate of 20 mgm./kgm. live-weight on each of three successive days to each of four pigs (average live-weight 20 kgm.). It is observed that this treatment removes all the lungworms, *Metastrongylus apri*, with marked clinical improvement in the animals. Control pigs which remain untreated are found to have an average of 417 lungworms in each animal.

*Example 27*

Cyanacethydrazide is injected subcutaneously as a 25% w./v. sterile solution in water at the rate of 15 mgm./kgm. live-weight on each of two successive days to a pig of live-weight 50 kgm. It is observed that this treatment removes all except 4 lungworms, *Metastrongylus apri*, which are present in the animal. There is also a marked clinical improvement in the animal. Control pigs which remain untreated are found to have an average of 417 lungworms in each animal.

*Example 28*

Cyanacethydrazide is injected subcutaneously as a 10% w./v. solution in arachis oil at the rate of 20 mgm./kgm. live-weight on each of three successive days to a pig. It is observed that this treatment removes all the lungworms, *Metastrongylus apri*, with marked clinical improvement in the animal.

*Example 29*

A foodstuff mixture containing piperazine diacetate and cyanacethydrazide is fed to a group of 4 pigs on each of three successive days such that each pig receives piperazine diacetate at a rate of 199 mgm./kgm. and cyanacethydrazide at the rate of 15 mgm./kgm. of live-weight (average live-weight 50 kgm.). It is observed that this treatment removes all the 45 intestinal worms, *Ascaris lumbricoides*, and the lungworms, *Metastrongylus apri*, with marked clinical improvement in all animals. Control pigs which remain untreated are found to have an average of 14 *Ascaris lumbricoides* and 242 *Metastrongylus apri* in each animal.

*Example 30*

1-diethylcarbamyl-4-methyl piperazine and cyanacethydrazide are mixed into a wet food and the mixture so obtained is fed to two pigs on each of three successive days such that each pig receives 1-diethylcarbamyl-4-methyl piperazine at a rate of 25 mgm./kgm. and cyanacethydrazide at a rate of 15 mgm./kgm. live-weight (average live-weight 52 kgm.). It is observed that this treatment removes 19 *Ascaris lumbricoides* leaving 2 in the intestines and all the lungworms, *Metastrongylus apri*, are removed with a marked clinical improvement in the animals. Control pigs which remain untreated are found to have an average of 14 *Ascaris lumbricoides* and 242 *Metastrongylus apri* in each animal.

*Example 31*

Cyanacethydrazide is injected subcutaneously as a 25% w./v. sterile solution in water at the rate of 20 mgm./kgm. and simultaneously sulphadimidine is injected subcutaneously as a 33.3% w./v. sterile solution in water at the rate of 0.15 gm./kgm. to a pig of live-weight 18 kgm. It is observed that this treatment removes the lungworms present and there is a marked clinical improvement in condition of the animals resulting from the action of the sulphadimidine on the coccidia, *Eimeria debliecki* and *Eimeria scabra*, and the removal of the lungworms, *Metastrongylus apri* by the cyanacethydrazide.

*Example 32*

Cyanacethydrazide is injected subcutaneously as a 25% w./v. sterile solution in water at the rate of 25 mgm./kgm. to a kid (live-weight 11 kgm.). It is observed that this treatment removes approximately 90% of the lungworms,

*Dictyocaulus filaria*, from the animal with marked clinical improvement. A control kid which remains untreated is found to have 2043 lungworms in the air passages.

Example 33

Cyanacethydrazide is injected subcutaneously as a 25% w./v. sterile solution in water at the rate of 50 mgm./kgm. to a kid (live-weight 13 kgm.). It is observed that this treatment removes 100% of the lungworms, *Dictyocaulus filaria*, from the air passages of the animal with marked clinical improvement. A control kid which remains untreated is found to have 2043 lungworms in the lungs.

Example 34

Cyanacethydrazide is injected subcutaneously as a 25% w./v. sterile solution in water at the rate of 25 mgm./kgm. to a goat (live-weight 19 kgm.) on each of three successive days. It is observed that this treatment removes all except one lungworm, *Dictyocaulus filaria*, from the animal with clinical improvement in condition. A control goat which remains untreated is found to have 1624 lungworms in the air passages.

Example 35

Cyanacethydrazide is injected subcutaneously as a 20% w./v. suspension in arachis oil at the rate of 15 mgm./kgm. to a goat (live-weight 30 kgm.) on each of three successive days. It is observed that this treatment removes all except 6 lungworms, *Dictyocaulus filaria*, from the animal. A control goat which remains untreated is found to have 1217 lungworms present.

Example 36

Cyanacethydrazide is administered as an oral drench as a 1% w./v. solution in water at the rate of 25 mgm./kgm. to a goat (live-weight 28 kgm.) on each of three successive days. It is observed that this treatment removes all the lungworms, *Dictyocaulus filaria*, from the animal with improvement in its clinical condition. A control goat which remains untreated is found to have 1624 lungworms present.

Example 37

Cyanacethydrazide is administered as an oral drench as a 2% w./v. solution in milk at the rate of 50 mgm./kgm. to a goat (live-weight 43 kgm.). It is observed that this treatment removes all except 5 lungworms, *Dictyocaulus filaria*, from the animal with marked clinical improvement. A control goat which remains untreated is found to have 1826 lungworms present.

Example 38

Cyanacethydrazide is administered orally at the rate of 10 mgm./kgm. on each of three successive days to 50 chicks aged one month. It is observed that this treatment gives a 75% cure for gapeworms, *Syngamus trachea*, and there is a marked reduction in the worms in the remainder of the group compared with the untreated control birds.

Example 39

10 parts of cyanacethydrazide are dissolved in 100 parts of oxygen-free water under nitrogen. The solution is sterilized by Seitz filtration under nitrogen. There is obtained a sterile aqueous solution which is stable when kept under nitrogen and is suitable for parenteral administration to animals for the treatment of lungworm infestations.

Example 40

10 parts of cyanacethydrazide and 0.1 part of sodium metabisulphite are dissolved in 100 parts of water and the solution sterilised by Seitz filtration. There is obtained a stabilised sterile aqueous solution suitable for parenteral administration to animals for the treatment of lungworm infestations.

Example 41

10 parts of cyanacethydrazide and 0.5 parts of sodium hydrosulphite are dissolved in 100 parts of water and the solution is sterilised by Seitz filtration. There is obtained a stabilised aqueous solution suitable for parenteral administration to animals for the treatment of lungworm infestations.

Example 42

10 parts of cyanacethydrazide and 1 part of glycine are dissolved in 100 parts of water and sterilised by Seitz filtration. There is obtained a stabilised aqueous solution suitable for parenteral administration to animals for the treatment of lungworm infestations.

Example 43

6 parts of cyanacethydrazide, 0.5 part of sodium metabisulphite and 0.2 part of a phenol-ethylene oxide condensation product (as dispersing agent) are dissolved in 75 parts of sterile water and the solution is filtered through a Seitz filter. 30 parts of sterile sulphadimidine are added aseptically to the sterile filtrate and the mixture is then ball-milled aseptically until the particle size of the sulphadimidine is substantially below 100 microns. There is thus obtained a stabilised sterile aqueous suspension suitable for parenteral administration to animals for the treatment of lungworm infestations.

Example 44

A mixture of 1635 parts of sterile cyanacethydrazide, 8174 parts of sterile sulphadimidine and 136 parts of sterile sodium metabisulphite is milled aseptically until the particle size is substantially below 100 microns. It is then transferred aseptically to a sterile mechanical mixer where it is agitated while being sprayed aseptically with a sterile solution of 55 parts of a phenol-ethylene oxide condensation product (as dispersing agent) dissolved in 400 parts of 80% ethanol. The powder is then dried aseptically under reduced pressure at a temperature below 50° C. to give a sterile stabilised powder. By mixing one part thereof with between 2 and 4 parts of sterile water there is obtained a sterile stabilised aqueous suspension suitable for parenteral administration to animals for the treatment of lungworm infestations.

Example 45

A mixture of 1658 parts of sterile cyanacethydrazide and 8287 parts of sterile sulphadimidine is milled aseptically until the particle size is substantially below 100 microns. It is then transferred aseptically to a sterile mechanical mixer where it is agitated while being sprayed aseptically with a sterile solution of 55 parts of a phenol-ethylene oxide condensation product (as dispersing agent) dissolved in 400 parts of 80% ethanol. The powder is then dried aseptically under reduced pressure at a temperature below 50° C. to give a sterile dispersible powder. By mixing one part thereof with between 2 and 4 parts of sterile water there is obtained a sterile aqueous suspension suitable for parenteral administration to animals for the treatment of lungworm infestations.

Example 46

A mixture of 10 parts of sterile cyanacethydrazide and 90 parts of sterile arachis oil is milled aseptically in a sterile ball-mill until the cyanacethydrazide particles are substantially below 100 microns in size. The suspension is separated from the balls and filled aseptically into sterile containers. There is thus obtained a sterile injectable arachis oil suspension of cyanacethydrazide suitable for parenteral administration to animals for the treatment of lungworm infestations.

Example 47

20 parts of cyanacethydrazide and 1 part of sodium metabisulphite are dissolved in 100 parts of water. The solution is filtered and there is thus obtained a stabilised aqueous solution suitable for oral administration to animals for the treatment of lungworm infestations.

Example 48

10 parts of cyanacethydrazide are mixed with 90 parts of chalk in a mechanical mixer and the mixture so obtained is then ground to a fine powder. There is thus obtained a powdered mixture which may be added to food to provide a mixture suitable for oral administration to animals for the treatment of lungworm infestations.

Example 49

An animal foodstuff composition is prepared from 0.313 part of cyanacethydrazide, 2.817 parts of ground chalk and 96.87 parts of animal foodstuff by addition of 3.13 parts of the product prepared as described in Example 48, to 96.87 parts of animal foodstuff in a convenient mixer. The product so obtained is suitable for oral administration to animals for the treatment of lungworm infestations.

Example 50

10 parts cyanacethydrazide are dissolved in 60 parts of boiling methanol and the solution is Seitz filtered and cooled. The sterile crystals are collected, dried aseptically at 40° C. in vacuo, mixed with 0.1 part of sodium metabisulphite in a sterile mechanical mixer and ground aseptically to a fine powder. There is thus obtained a sterile mixture 5 parts of which may be dissolved in sterile water to give a stabilised solution suitable for parenteral administration to animals for the treatment of lungworm infestations.

Example 51

5 parts cyanacethydrazide, 0.6 part sodium penicillin G, 0.024 part of anhydrous sodium citrate and 0.05 part sodium metabisulphite are dissolved in water and the solution is sterilised by Seitz filtration. There is thus obtained a sterile stabilised solution suitable for parenteral administration to animals for the treatment of lungworm infestations.

Example 52

5 parts cyanacethdrazide, 0.6 part sodium penicillin G and 0.024 part anhydrous sodium citrate are dissolved in 20 parts of water. The solution is sterilised by Seitz filtration and there is thus obtained a sterile solution suitable for parenteral administration to animals for the treatment of lungworm infestations.

Example 53

50 parts of sterile cyanacethdrazide, 6 parts of sterile sodium penicillin G, 0.24 part sterile anhydrous sodium citrate and 0.5 part of sterile sodium metabisulphite are mixed aseptically in a sterile mixer and ground aseptically to a fine powder. There is thus obtained a sterile mixture 5.67 parts of which may be dissolved in sterile water to give a stabilised solution suitable for parenteral administration to animals for the treatment of lungworm infestations.

Example 54

25 parts of sterile cyanacethydrazide, 5 parts of sterile procaine penicillin G, 0.5 part of sterile sodium metabisulphite, 0.15 part of sterile product obtained from the condensation of octylcresol with 8–10 molecular proportions of ethylene oxide and 0.15 part of sodium carboxymethylcellulose are mixed aseptically in a mechanical mixer and ground aseptically to a fine powder such that the particles are substantially below 100 microns in size. 69 parts of sterile water are added to the powder and thoroughly mixed and there is thus obtained a stabilised sterile suspension suitable for parenteral administration to animals for the treatment of lungworm infestations.

Example 55

25 parts of sterile cyanacethydrazide, 5 parts of procaine penicillin G, 0.15 part of sterile product obtained from the condensation of octylcresol with 8–10 molecular proportions of ethylene oxide and 0.15 part of sterile sodium carboxymethylcellulose are mixed aseptically in a mechanical mixer and ground aseptically to a fine powder, such that the particles are substantially below 100 microns. There is thus obtained a sterile dispersible powder which may be added to water for parenteral administration to animals for the treatment of lungworm infestations.

Example 56

A mixture of 25 parts sterile cyanacethydrazide, 0.1 part of sterile propyl gallate and 74.9 parts of sterile arachis oil is milled aseptically in a sterile ball-mill until the cyanacethydrazide particles are substantially below 100 microns in size. The suspension is separated from the balls and filled aseptically into sterile containers. There is thus obtained a sterile suspension in oil suitable for parenteral administration to animals for the treatment of lungworm infestations.

Example 57

A mixture of 25 parts of sterile cyanacethydrazide, 5 parts of sterile procaine penicillin G and 70 parts of sterile arachis oil is milled aseptically in a sterile ball-mill until the cyanacethydrazide and procaine penicillin G particles are substantially below 100 microns in size. The suspension is separated from the balls and filled aseptically into suitable containers. There is thus obtained a sterile suspension in oil suitable for parenteral administration to animals for the treatment of lungworm infestations.

Example 58

15 parts of cyanacethydrazide, 3 parts of 1-diethylcarbamyl-4-methylpiperazine dihydrogen citrate and 0.15 part of sodium metabisulphite are dissolved in 100 parts of water and the solution is Seitz filtered. There is thus obtained a sterile stabilised solution suitable for parenteral administration to animals for the treatment of lungworm infestations.

Example 59

20 parts of cyanacethydrazide and 4 parts of 1-diethylcarbamyl-4-methylpiperazine dihydrogen citrate are dissolved in 100 parts of water and Seitz filtered. There is thus obatined a sterile solution suitable for parenteral administration to animals for the treatment of lungworm infestations.

Example 60

1 part of sodium metabisulphite is mixed with 100 parts of cyanacethydrazide in a mechanical mixer and the mixture so obtained is then ground to a fine powder. There is thus obtained a mixture which may be added to water or milk to give a stabilised solution or suspension suitable for oral administration to animals for the treatment of lungworm infestations.

Example 61

A mixture of 1300 parts of cyanacethydrazide, 8642 parts of sulphadimidine and 13 parts of sodium metabisulphite is milled until the particle size is substantially below 100 microns. It is then transferred to a mechanical mixer where it is agitated while being sprayed with a mixture of 12.5 parts of disodium methylene-bis-naphthalene-2-sulphonate, 10 parts of polyglyceryl ricinoleate and 22.5 parts of water. There is thus obtained a dispersible powder which may be added to water to give a stabilised aqueous suspension suitable for oral administration to animals for the treatment of lungworm infestations.

Example 62

859 parts of tripiperazine dicitrate pentahydrate, 140 parts cyanacethydrazide and 1.4 parts of sodium metabisulphite are mixed in a mechanical mixer and the mixture so obtained is then ground to a fine powder. There is thus obtained a powder which may be added to water to give a stabilised solution or suspension suitable for oral administration to animals for the treatment of lungworm infestations.

Example 63

836 parts of piperazine diacetate, 163 parts of cyanacethydrazide and 1.6 parts of sodium metabisulphite are mixed in a mechanical mixer and the mixture so obtained is then ground to a fine powder. There is thus obtained a powder which may be added to water to give a stabilised solution or suspension suitable for oral administration to animals for the treatment of lungworm infestations.

Example 64

800 parts of piperazine dihydrochloride, 199 parts of cyanacethydrazide and 1.9 parts of sodium metabisulphite are mixed in a mechanical mixer and the mixture so obtained is then ground to a fine powder. There is thus obtained a powder which may be added to water to give a stabilised solution or suspension suitable for oral administration to animals for the treatment of lungworm infestations.

Example 65

20 parts of cyanacethydrazide, 165 parts of phenothiazine, 10 parts di-isopropyl naphthalene sodium sulphonate (as dispersing agent) and 0.2 part of sodium metabisulphite are mixed in a mechanical mixer and the mixture so obtained is ground to a fine powder. There is thus obtained a powder which may be added to water to give a stabilised aqueous suspension suitable for oral administration to animals for the treatment of lungworm infestations.

Example 66

100 parts of cyanacethydrazide, 5 parts of calcium phosphate, 1 part of sodium metabisulphite and 894 parts of urea are mixed in a mechanical mixer and the mixture so obtained is ground to a fine powder. There is thus obtained a mixture which may be added to water to give a stabilised suspension suitable for oral administration to animals for the treatment of lungworm infestations.

Example 67

100 parts of cyanacethydrazide, 1 part of sodium metabisulphite and 89 parts of chalk are mixed in a mechanical mixer and the mixture so obtained is ground to a fine powder. There is thus obtained a mixture which may be added to water to give a stabilised suspension or to food to provide suitable compositions for oral administration to animals for the treatment of lungworm infestations.

Example 68

100 parts of cyanacethydrazide, 1 part of sodium metabisulphite and 899 parts of kaolin are mixed in a mechanical mixer and the mixture so obtained is ground to a fine powder. There is thus obtained a mixture which may be added to food or to water for oral administration to animals for the treatment of lungworm infestations.

Example 69

100 parts of cyanacethydrazide, 1 part of sodium metabisulphite and 899 parts of talc are mixed in a mechanical mixer and the mixture so obtained is ground to a fine powder. There is thus obatined a mixture which may be added to food or to water for oral administration to animals for the treatment of lungworm infestations.

Example 70

2900 parts of tripiperazine dicitrate pentahydrate, 430 parts of cyanacethydrazide, 5 parts of sodium metabisulphite and 6665 parts of urea are mixed in a mechanical mixer and the mixture so obtained is then ground to a fine powder. There is thus obtained a mixture which may be added to water to give a stabilised solution or suspension suitable for oral administration to animals for the treatment of lungworm infestations.

Example 71

2820 parts of piperazine diacetate, 500 parts cyanacethydrazide (5 parts sodium metabisulphite and 6675 parts of urea are mixed in a mechanical mixer and the mixture so obtained is then ground to a fine powder. There is thus obtained a mixture which may be added to water to give a stabilised solution or suspension suitable for oral administration to animals for the treatment of lungworm infestations.

Example 72

2,700 parts of piperazine dihydrochloride, 600 parts of cyanacethydrazide, 6 parts of sodium metabisulphite and 6694 parts of urea are mixed in a mechanical mixer and the mixture so obtained is then ground to a fine powder. There is thus obtained a mixture which may be added to water to give a stabilised solution or suspension suitable for oral administration to animals for the treatment of lungworm infestations.

Example 73

200 parts of 1-diethylcarbamyl-4-methylpiperazine dihydrogen citrate, 100 parts of cyanacethydrazide and 1 part of sodium metabisulphite are mixed in a mechanical mixer and the mixture so obtained is then ground to a fine powder. There is thus obtained a mixture which may be added to water to give a stabilised solution or suspension suitable for oral administration to animals for the treatment of lungworm infestations.

Example 74

313 parts of cyanacethydrazide and 3.13 parts of sodium metabisulphite are mixed in a mechanical mixer and then ground to a fine powder. This mixture is added to 99,684 parts of an animal foodstuff and mixed in a convenient mixer. The animal foodstuff composition so obtained is suitable for oral administration to animals for the treatment of lungworm infestations.

Example 75

10 parts of cyanacethydrazide, 80 parts of hexachloroethane, 0.1 part of sodium metabisulphite and 0.16 part of sodium tri-isopropylnaphthalene sulphonate (as dispersing agent) are mixed in a mechanical mixer and the mixture is ground to a fine powder. There is thus obtained a mixture which may be added to water to give a stabilised suspension suitable for oral administration to animals for the treatment of lungworm infestations.

Example 76

A mixture of 1300 parts of cyanacethydrazide and 8655 parts of sulpha-dimidine is milled until the particle size is substantially below 100 microns. It is then transferred to a mechanical mixer where it is agitated while being sprayed with a mixture of 12.5 parts of disodium methylene-bis-naphthalene-2-sulphonate, 10 parts of polyglyceryl ricinoleate and 22.5 parts of water. There is thus obtained a mixture which may be added to water to give a suspension suitable for oral administration to animals for the treatment of lungworm infestations.

Example 77

860 parts of tripiperazine dicitrate pentahydrate and 140 parts of cyanacethydrazide are mixed in a mechanical mixture and the mixture so obtained is then ground to a fine powder. There is thus obtained a mixture which may be added to food for oral administration to animals for the treatment of lungworm infestations.

Example 78

20 parts of cyanacethydrazide, 165 parts of phenothiazine, 10 parts of di-isopropylnaphthalene sodium sulphonate (as dispersing agent) are mixed in a mechanical mixer and the mixture so obtained is ground to a fine powder. There is thus obtained a mixture which may be added to water to give an aqueous suspension suitable for oral administration to animals for the treatment of lungworm infestations.

Example 79

282 parts of piperazine diacetate, 50 parts of cyanacethydrazide and 668 parts of urea are mixed in a mechanical mixer and the mixture so obtained is then ground to a fine powder. There is thus obtained a mixture which may be added to water or to food for oral administration to animals for the treatment of lungworm infestations.

Example 80

290 parts of tripiperazine dicitrate pentahydrate, 43 parts of cyanacethydrazide and 667 parts of urea are mixed in a mechanical mixer and the mixture so obtained is then ground to a fine powder. There is thus obtained a mixture which may be added to food for oral administration to animals for the treatment of lungworm infestations.

Example 81

2 parts of 1-diethylcarbamyl-4-methylpiperazine dihydrogen citrate and 1 part cyanacethydrazide are mixed in a mechanical mixer and the mixture so obtained is then ground to a fine powder. There is thus obtained a mixture which may be added to food for oral administration to animals for the treatment of lungworm infestations.

Example 82

100 parts of cyanacethydrazide and 895 parts of urea are mixed in a mechanical mixer and the mixture so obtained is ground to a fine powder. There is thus obtained a mixture which may be added to water to give a solution or suspension suitable for oral administration to animals for the treatment of lungworm infestations.

Example 83

10 parts of cyanacethydrazide and 90 parts of talc are mixed in a mechanical mixer and the mixture so obtained is ground to a fine powder. There is thus obtained a mixture which may be added to food for oral administration to animals for the treatment of lungworm infestations.

Example 84

10 parts of cyanacethydrazide and 90 parts of kaolin are mixed in a mechanical mixer and the mixture so obtained is ground to a fine powder. There is thus obtained a mixture which may be added to food for oral administration to animals for the treatment of lungworm infestations.

Example 85

10 parts of cyanacethydrazide, 80 parts of hexachloroethane and 0.16 part of sodium tri-isopropylnaphthalene sulphonate (as dispersing agent) are mixed in a mechanical mixture and the mixture ground to a fine powder. There is thus obtained a mixture which may be added to water to give a suspension suitable for oral administration to animals for the treatment of lungworm infestations.

Example 86

1 part of sodium metabisulphite is mixed with 100 parts of cyanacethydrazide in a mechanical mixer and ground to a fine free-flowing powder. This powder is filled into hard gelatin capsules which are then suitable for use in oral administration to animals for the treatment of lungworm infestations.

Example 87

10 parts of cyanacethydrazide, 0.1 part of sodium metabisulphite, 30 parts of calcium phosphate and 7.5 parts of maize starch are mixed in a mechanical mixer and sufficient 10% maize starch paste is added to form a granular mass. The mass is dried at 40° C. and the aggregates are broken up by screening. 0.5 part of magnesium stearate is mixed in mechanically and the material so obtained is compressed into tablets each containing 1 part of cyanacethydrazide. The tablets so obtained are useful in the treatment of lungworm infestations in animals.

Example 88

2 parts of cyanacethydrazide, 8 parts of urea, 0.02 part of sodium metabisulphite, 30 parts of calcium phosphate and 7.5 parts of maize starch are mixed in a mechanical mixer and sufficient 10% maize starch paste added to form a granular mass. The mass is dried at 40° C. and the aggregates are broken up by screening. 0.5 part of magnesium stearate is mixed in mechanically and the material so obtained is compressed into tablets each containing 0.2 part of cyanacethydrazide. The tablets so obtained are useful in the treatment of lungworm infestations in animals.

Example 89

2 parts of cyanacethydrazide, 8 parts of piperazine dihydrochloride, 30 parts of calcium phosphate and 7.5 parts of maize starch are mixed in a mechanical mixer and sufficient 10% maize starch is added to form a granular mass. The mass is dried at 40° C. and the aggregates are broken up by screening. 0.5 part of magnesium stearate is then mixed in mechanically and the material so obtained is compressed into tablets each containing 0.2 part of cyanacethydrazide and 0.8 part of piperazine dihydrochloride. The tablets so obtained are useful in the treatment of lungworm infestations in animals.

Example 90

2 parts of cyanacethydrazide, 8 parts of urea, 30 parts of calcium phosphate and 7.5 parts of maize starch are mixed in a mechanical mixer and sufficient 10% maize starch paste is added to form a granular mass. The mass is dried at 40° C. and the aggregates are broken up by screening. 0.5 part of magnesium stearate is then mixed in mechanically and the material so obtained is compressed into tablets each containing 0.2 part of cyanacethydrazide. The tablets so obtained are useful in the treatment of lungworm infestations in animals.

Example 91

1 part of cyanacethydrazide, 9 parts of urea and 60 parts of ground oats are mixed in a mechanical mixer and 30 parts of a potato starch paste are added to form a plastic mass. This mass is granulated, dried at 40° C. and then compressed into shaped blocks which are then suitable for oral administration to animals for the treatment of lungworm infestations.

Example 92

1 part of cyanacethydrazide, 0.01 part of sodium metabisulphite and 70 parts of ground oats are mixed in a mechanical mixer and 30 parts of 12.5% mucilage of tragacanth are added to form a plastic mass. The mass is granulated, dried at 40° C. and compressed into shaped blocks which are then suitable for oral administration to animals for the treatment of lungworm infestations.

Example 93

1 part of cyanacethydrazide, 9 parts of urea and 60 parts of ground oats are mixed in a mechanical mixer and 30 parts of 12.5% mucilage of tragacanth are added to form a plastic mass. The mass is extruded through an aperture to form cylindrical masses which are dried at 40° C. This solid material so obtained is suitable for oral administration to animals for the treatment of lungworm infestations.

What we claim is:

1. Process for the treatment of animals with worm infestations which comprises introducing into the said animals an effective amount of cyanacethydrazide.

2. Process as claimed in claim 1 wherein the cyanacethydrazide is introduced into said animals as an aqueous composition thereof containing between 0.5% and 30% by weight of cyanacethydrazide.

3. Process as claimed in claim 1 wherein the cyanacethydrazide is used in admixture with an injectable vegetable oil, the mixture containing at least 0.5% by weight of cyanacethydrazide.

4. A new veterinary composition of matter suitable for oral administration containing 10% by weight of cyanacethydrazide, 0.1% by weight of sodium metabisulphite, 0.5% by weight of calcium phosphate and 89.4% by weight of urea.

5. A new foodstuff composition which comprises a composition as claimed in claim 4 in admixture with an animal foodstuff in such proportion as to produce a foodstuff composition wherein there is is a concentration of 0.05% by weight of cyanacethydrazide.

6. A new veterinary composition suitable for oral administration containing 6 parts by weight of tripiperazine dicitrate pentahydrate to 1 part by weight of cyanacethydrazide and sodium metabisulphite.

7. A new veterinary composition which is an aqueous dispersible powder containing 13% by weight of cyanacethydrazide, 0.13% by weight of sodium metabisulphite, 0.125% by weight of disodium methylene-bis-naphthalene-2-sulphonate, 0.1% by weight of polyglyceryl ricinoleate and 86.65% by weight of sulphadimidine.

8. A veterinary composition useful for treating lungworm infestation comprising a sterile mixture of water and from 0.5 to 30% by weight of cyanacethydrazide, said composition including an antioxidant selected from the group consisting of water-soluble hydrosulphite and metabisulphite and sulphur dioxide.

9. Compositions as claimed in claim 8 wherein the water-soluble hydrosulphite is sodium hydrosulphite.

10. Compositions as claimed in claim 8 wherein the water-soluble metabisulphite is sodium metabisulphite.

11. Compositions of matter which are sterile mixtures of water and cyanacethydrazide comprising not less than 0.5% by weight of cyanacethydrazide, and including 1-diethylcarbamyl-4-methylpiperazine.

12. A veterinary composition useful for treating lungworm infestation comprising a mixture of phenothiazine and cyanacethydrazide.

References Cited in the file of this patent

UNITED STATES PATENTS 2,849,369     Muset _____ Aug. 26, 1958

OTHER REFERENCES

Mukherjee: J. of Pharm. and Pharmacol., vol. 7, 1955, pp. 35–38.

Barnett: Brit. Med. J., September 10, 1955, pp. 647–649.

Calvet: Chem. Abst., vol. 48, 1954, p. 10302.